United States Patent [19]
Moore et al.

[11] Patent Number: 4,460,225
[45] Date of Patent: Jul. 17, 1984

[54] THERMOCOUPLE WIRING HARNESS AND CONNECTOR SYSTEM

[75] Inventors: M. Samuel Moore; Aramais Harootion, both of Northridge, Calif.

[73] Assignee: Semco Instruments, Inc., No. Hollywood, Calif.

[21] Appl. No.: 330,832

[22] Filed: Dec. 15, 1981

[51] Int. Cl.³ .......................................... H01R 13/22
[52] U.S. Cl. ................................. 339/28; 339/92 M; 339/147 R; 339/157 C
[58] Field of Search .................... 339/28, 29, 30, 92, 339/147, 157

[56] References Cited

U.S. PATENT DOCUMENTS

| 1,152,005 | 8/1915 | Clark | 339/92 M |
| 1,338,130 | 4/1920 | Hazelett | 339/32 R |
| 1,843,389 | 2/1932 | Fischer | 339/28 |
| 2,558,029 | 6/1951 | Wood | 339/157 C |
| 2,992,402 | 7/1961 | Thomas | 339/147 |
| 3,311,864 | 3/1967 | Walker | 339/147 |
| 3,437,978 | 4/1969 | Quackenbush | 339/92 R |
| 3,513,429 | 5/1970 | Helsop | 339/DIG. 1 |
| 3,553,633 | 1/1971 | Ondrejka | 339/92 M |
| 3,731,258 | 5/1973 | Spicer | 339/92 M |

FOREIGN PATENT DOCUMENTS

| 289213 | 12/1914 | Fed. Rep. of Germany | 339/92 M |
| 759293 | 1/1934 | France | 339/157 C |

OTHER PUBLICATIONS

IBM Bulletin, vol. 9, No. 10, Mar. 1967, "Electrical Plug Jack Housing", by J. W. Garland.

Primary Examiner—Joseph H. McGlynn
Assistant Examiner—Gary F. Paumen
Attorney, Agent, or Firm—Poms, Smith, Lande & Rose

[57] ABSTRACT

A high temperature thermocouple wiring harness and connector system incorporating multiple individual thermocouple probes replaceably attached through connectors to the wiring harness. Each connector has a wiring harness portion, a removable probe portion, and a fastener for holding the two portions together. The wiring harness portion has a housing and two electrical conductors connected to the cable of the wiring harness and having contact surfaces outside the housing. The removable probe portion has a similar housing, a thermocouple probe mounted on the housing, and two electrical conductors attached to the thermocouple and having contact surfaces outside the housing. The fastener retains the connector portions together and insures that the contact surfaces of the conductors are held together. The fastener is formed of a material that has a coefficient of thermal expansion less than the coefficient of thermal expansion of the connector portions. As the ambient temperature surrounding the connector increases, the lower relative coefficient of thermal expansion of the fastener in relation to the connector portion causes the conductors to be held together with increasing force.

18 Claims, 11 Drawing Figures

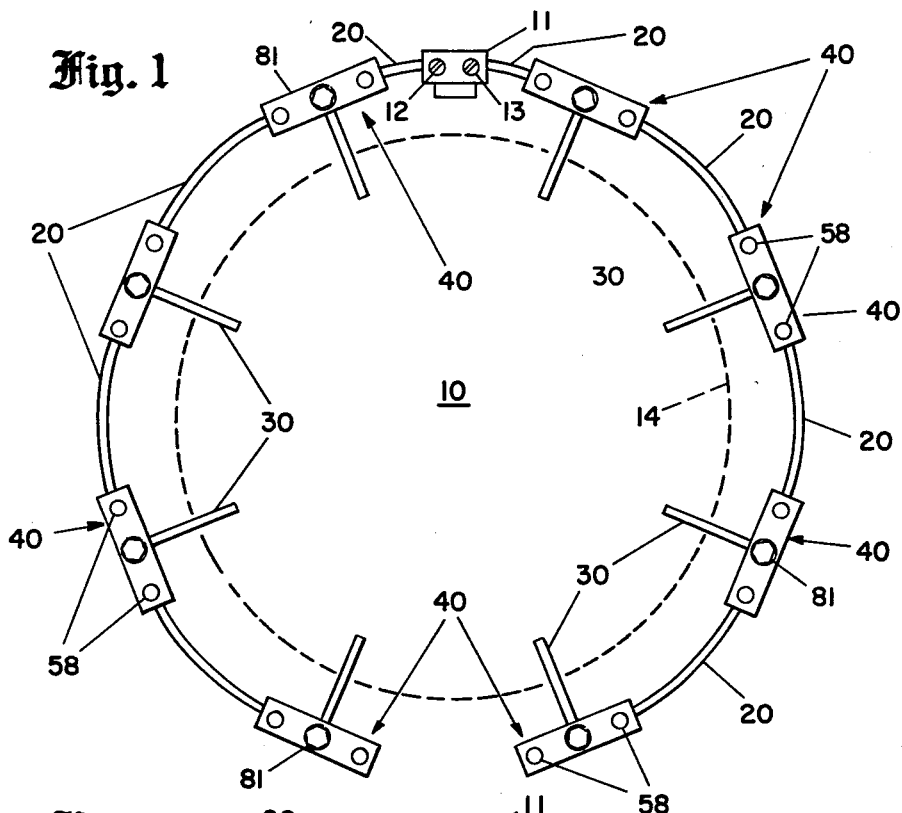
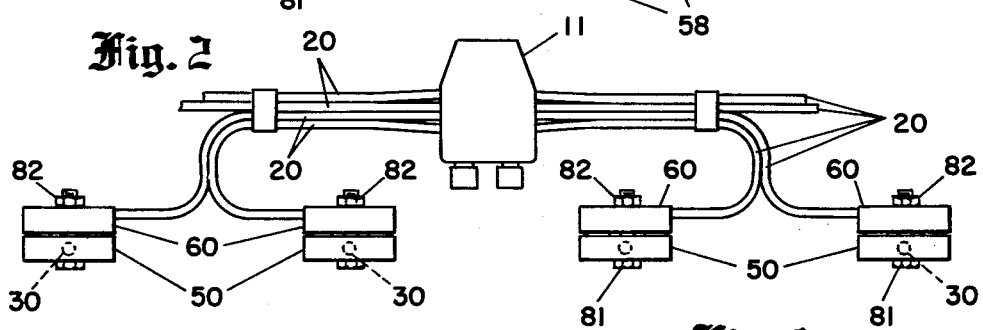
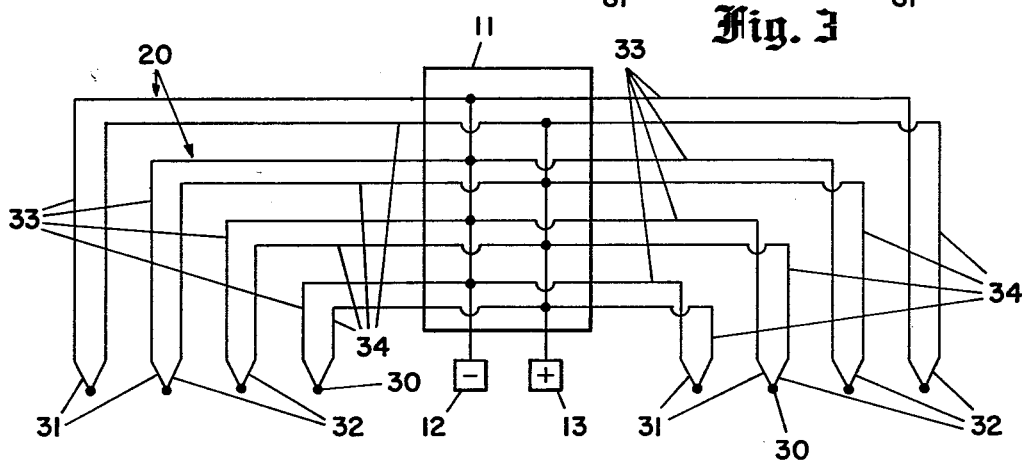

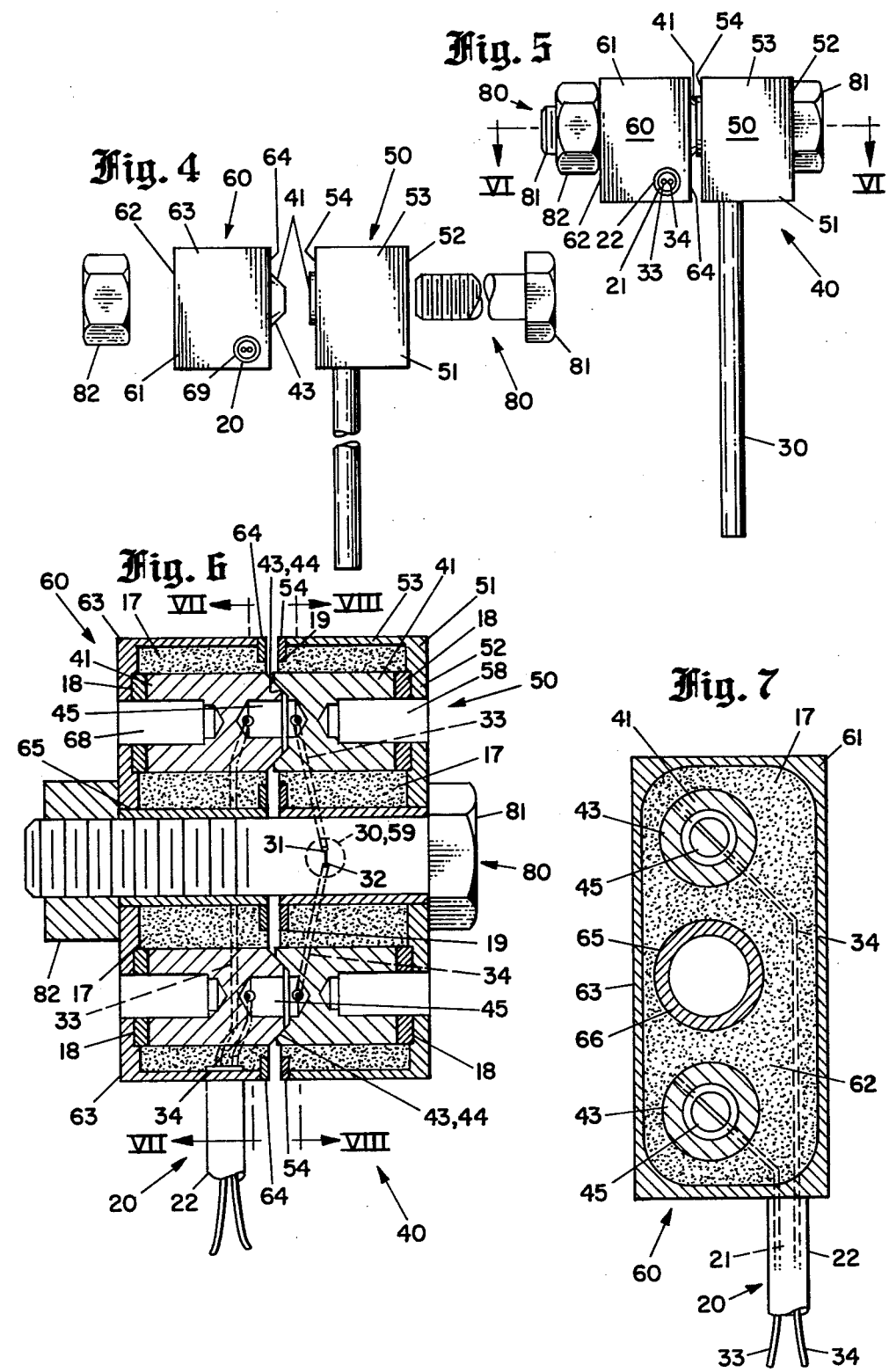

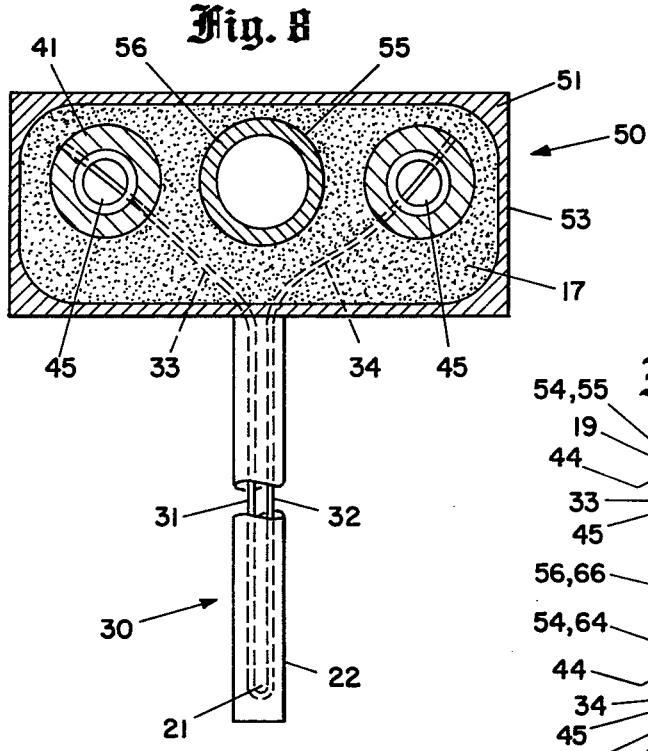
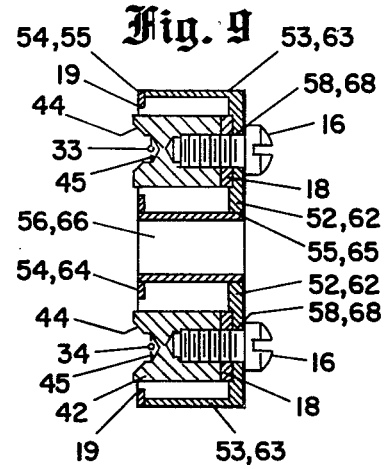
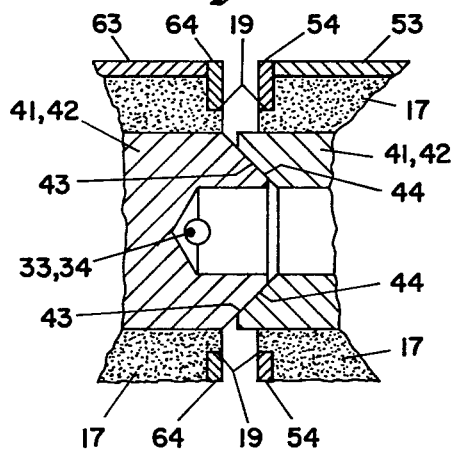
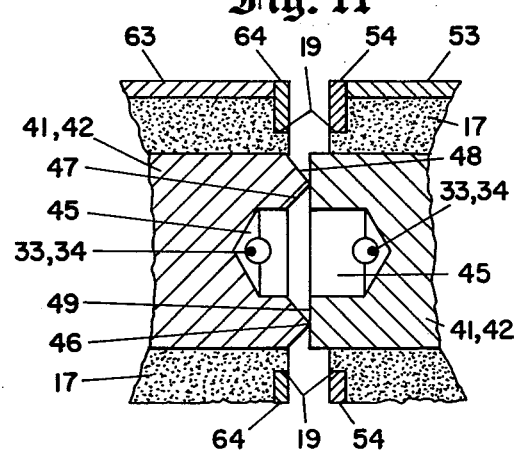

THERMOCOUPLE WIRING HARNESS AND CONNECTOR SYSTEM

This invention relates generally to electrical connectors adapted for use in adverse environments and, more specifically, to high temperature wiring harness connectors for selectively interconnecting multiple thermocouple probes to sense operating temperature at various locations in an engine.

BACKGROUND OF THE INVENTION

Thermocouples are known in the art as devices which sense temperatures and changes of temperature in their environment. They are typically formed of an elongated probe containing two metallic elements, each of said elements having a different electrical response to the ambient temperature surrounding the probe such that, when connected together, the two elements have a variable electrical property, the output thermoelectric force, a relatively small voltage which is detectable, measurable, and variable in response to variations in temperature of the probe's environment.

The operating temperature of an engine may be monitored to insure efficient operation and prevent malfunction by placing multiple thermocouple probes at certain predetermined locations within the engine. For example, in a jet engine, it is highly desirable to place multiple thermocouple probes in evenly spaced positions about the periphery of an exhaust manifold. In this manner, the temperature of the exhaust gases may be monitored to determine engine efficiency, and any localized hot-spots may be detected before damage to the engine occurs. These multiple probes may be interconnected in parallel to provide an averaged reading of the general temperature in the exhaust port and, thus, an indication of the completeness or efficieny with which fuel is being combusted within the jet engine. Another application for thermocouples having an adverse environment is the detection of operating temperatures within the pile of a nuclear reactor. In both of these exemplary applications excessive temperatures are encountered, frequently over 1000 degrees Farenheit, and corrosive gases in the surrounding spaces have a magnified corrosive effect when coupled with a high-temperature environment.

Thermocouple probe and cable combinations have been designed to operate within these adverse environments. For example, the cable connecting the thermocouple probe to an electronic sensor that senses the thermoelectric power generated by the thermocouple probe may be sheathed in a corrosion resistant metal tubing such as stainless steel. Within the metal sheath a number of electrical wires can extend which are surrounded by a high-density insulator such as Magnesia (MgO). In previous constructions, a thermocouple probe extended out of one side of a housing and into the engine or other environment to be sensed for temperature. Connected to that probe and extending out of the other side of the housing was a cable containing wires electrically connected to the probe which were, in turn, connected to an electronic device for measuring the thermoelectric voltage developed within the thermocouple probe and thereby computing operating temperatures within the probe environment. Typically the sheath of this cable must be brazed to, or otherwise permanently connected with, the thermocouple probe and housing in a manner which presents a uniform sealed surface to the corrosive environment external of the engine. Because of the need for a complete seal and protection from the corrosive environment, replacement of a single thermocouple probe in a network of multiple probes permanently interconnected by sheathed cables required replacement of the entire wiring harness and all probes attached thereto.

In a jet engine which may have eight thermocouple probes connected in parallel about its periphery, for example, it is an expensive process to replace the entire set of eight probes and interconnecting wiring harness whenever one probe fails. Simply cutting out a failed probe and reattaching a replacement thermocouple probe in the wiring harness can frequently be more costly than replacing the entire wiring harness due to the need to hermetically seal the new probe to the existing wiring harness (a process which typically requires not only splicing in the electrical connection wires for connecting the probe to the rest of the wiring harness, but brazing the sheath of the wiring harness to the probe housing such that the combined assembly would be sufficiently corrosion resistant).

Accordingly, a principal object of the present invention is to provide a more convenient method of replacing a single thermocouple probe of a wiring harness containing multiple thermocouple probes. A collateral object of the present invention is to disclose and provide a connector system for replaceably connecting individual thermocouple probes with a wiring harness which is, itself, corrosion resistant without the need for brazing or other costly replacement procedures. A further object of the present invention is to provide an electrical connector apparatus for connecting a thermocouple probe to a wiring harness which is sufficiently reliable and temperature insensitive such that the accuracy of the temperature sensing of the thermocouple probe is not affected by variations of the temperature of the environment of the connector itself, external of the engine exhaust manifold, or by corrosion of the connector due to its exposure to a corrosive environment as the corrosion develops over the useful life of the connector.

SUMMARY OF THE INVENTION

The present invention comprises a wiring harness system for interconnecting multiple thermocouple probes which includes an improved multiple-conductor electrical connector. The conducting elements of the connector are formed of a highly-conductive material and are assembled into connector portions which reliably and effectively maintain electrical connection between a thermocouple probe and the wiring harness throughout a range of environmental temperatures while being insensitive to corrosive environments.

In general, the connector of the present invention is comprised of a probe portion and a wiring harness portion. The probe portion is formed of a corrosion-resistant housing which has extending therefrom a thermocouple probe adapted to be mounted and extend into the environment which is to be sensed for temperature. In addition, the probe portion has a plurality of conductor elements positioned within said housing and electrically insulated therefrom. Each of the conductor elements is electrically connected to one of the metallic elements of the thermocouple probe. Each of the conductor elements further has a contact surface exposed outwardly of the probe housing. The wiring harness portion of the connector consists of a housing having a cable attached thereto and extending therefrom, the cable interconnects the wiring harness portion with other wiring harness portions and their associated thermocouples, and further connects to an electronic device for processing the variable electrical characteristic of the multiple thermocouple probes. The housing of the wiring harness portion contains a similar plurality of conductor elements which are positioned within, and electrically insulated from, the housing. Each of the conductor elements has a contact surface extending outwardly from said housing and being configured to mate with the contact surface of a respective conductor element of the probe portion of said connector. The connector further includes a fastener for selectively and releasably fastening the probe portion to the wiring harness portion such that the contact surfaces of the conductor elements of each of said portions are retained in a mated, engaged and electrically conductive position. It is specifically contemplated by the present invention that the fastener has a coefficient of thermal expansion which is less than, the coefficient of thermal expansion of the connector portions. In accordance with this one aspect of the present invention, as the environmental temperature of the connector increases, the lesser coefficient of thermal expansion of the fastener relative to the connector portions causes the conductor elements to be securely held in a mated and electrically conductive position with increasing temperature.

In accordance with another aspect of the present invention, the contact surfaces of the respective mated conductor elements are configured to insure a positive engagement of the conductor elements in a manner which seals the contact surfaces from the corrosive environment. The configuration further being self-aligning to automatically compensate for corrosion during the usual life of the connector and maintain a uniformly-conductive connection of the conductor elements. In accordance with this aspect of the present invention, two alternative configurations of the contact surfaces are disclosed. In the first configuration, the contact surfaces of a respective conductor element of the probe portion and a conductor element of the wiring harness portion of the connector define an electrically-contacting surface formed of the surface of a truncated right frustum cone. In the second configuration, the contacting surfaces of the respective conductor elements, when in a mated and engaged relationship, form an annulus having a V-shaped cross-section when viewed in the plane of a radian. These two configurations of contacting surfaces have the advantages of becoming more effectively electrically-connected when compressively loaded in response to increases in temperature of the connector environment as a result of the lower thermal coefficient of expansion of the fastener. This same loading and contacting surface configuration further efficiently seals and protects the radially interior portions of the contacting surface from the corrosive environment of the connector.

Viewed from another aspect, the multiple thermocouple system includes a fixed wiring harness with an associated set of fixed connectors, a matching set of removable connectors each having a thermocouple extending therefrom, and fastening arrangements for securing said removable connectors to said fixed connectors so that as the temperature increases the contact pressure between the elements increases. This is preferably accomplished by the use of a fastener having a lower coefficient of thermal expansion than that of the connectors.

Other features of the invention include the use of conical connector surfaces, the use of fine and coarse finishes on opposed connectors, and the use of pairs of heavy connector elements in each conductor or connector pair of the same composition as the thermocouple materials.

The advantages of the general configuration of the connector includes the ability to easily and quickly separate and replace a single defective thermocouple probe from a wiring harness that contains multiple thermocouple probes. The connection made by the conductor elements of the connector are electrically efficient and improve with increasing adverse environmental temperature and are self-sealing to minimize the effects of corrosive gases in the connector environment over the useful life of the connector.

Other objects, features, and advantages of the present invention will become apparent from a consideration of the following detailed description in combination with a review of the accompanying drawings, as follows.

BRIEF DESCRIPTION OF THE DRAWINGS

FIG. 1 is an end view of the general arrangement of multiple thermocouple probes equiangularly positioned about a chamber such as an engine exhaust, said probes being interconnected by a wiring harness, illustrative of the present invention;

FIG. 2 is an enlarged top plan view of the wiring harness of FIG. 1;

FIG. 3 is a schematic diagram of the electrical connections made by the wiring harness of FIG. 1;

FIG. 4 is an exploded side view of one connector of the apparatus of FIG. 1;

FIG. 5 is a side view similar to FIG. 4 of the connector of FIG. 4 in an assembled condition;

FIG. 6 is a top cross-sectional view of the connector of FIG. 5 taken in section along plane VI—VI of FIG. 5.

FIG. 7 is an end cross-sectional view of the wiring harness portion of the connector of FIG. 6 taken in section along plane VII—VII of FIG. 6;

FIG. 8 is an end cross-sectional view of the probe portion of the connector of FIG. 6 taken in section along plane VIII—VIII of FIG. 6;

FIG. 9 is a top cross-sectional view similar to FIG. 6 of one portion of the connector at one stage of the manufacture and assembly of the connector portion;

FIG. 10 is an enlarged top cross-sectional view similar to FIG. 6 of a portion of the connector of FIG. 6 showing one configuration of the conductor element contacting surfaces; and FIG. 11 is an enlarged top cross-sectional view similar to FIG. 6 of a portion of the connector of FIG. 6 showing an alternative configuration of the conductor element contacting surfaces.

DETAILED DESCRIPTION OF A PREFERRED EMBODIMENT

Referring initially to FIGS. 1 and 2, a wiring harness system for interconnecting a plurality of thermocouple probes is shown. The wiring harness system 10 includes a plurality of thermocouple probes 30 connected by respective connectors 40 to cables 20 which are each, in turn, connected to a central junction box 11. In this preferred embodiment, eight thermocouple probes 30 are provided, equiangularly displaced about a chamber; for example, a cylindrical jet engine exhaust manifold, diagramatically shown by dashed line 14 of FIG. 1. As shown, each of the thermocouple probes 30 may penetrate into or may extend close to the engine chamber to sense the operating temperature of that chamber.

Although the present invention is intended to connect any number of connecting wires to interconnect the thermocouple probes, this preferred embodiment utilizes two-element thermocouple probes 30 interconnected by two-wire cables 20. As particularly shown in FIGS. 3 and 8, each thermocouple probe 30 is comprised of an alumel element 31 (94% Ni, 3% Mn, 1% Si, 2% Al) and a chromel element 32 (90% Ni, 10% Cr). Other possible thermocouple materials include, for example, iron, constantan, copper, platinum, rhodium, and Platinel. Each alumel element 31 is electrically connected to a respective alumel wire 33 which electrically connects said element to the alumel terminal 12 of junction box 11. Similarly, each chromel element 32 is electrically connected by a respective chromel wire 34 to the chromel terminal 13 of junction box 11. In this manner, each of the eight thermocouple probes 30 are connected in parallel such that, together, they sense the average operating temperature within the chamber defined by the dashed line 14 of FIG. 1.

As shown in FIGS. 4 and 6, cable 20 is constructed to withstand highly corrosive environments. Each portion of cable 20 contains an alumel wire 33 and a chromel wire 34, each surrounded by a high-density electrical insulator such as Magnesia (MgO) 21. The two wires and Magnesia insulator are protectively contained within a metallic sheath 22, preferably formed of stainless steel. Referring to FIG. 8, the alumel element 31 and the chromel element 32 of each thermocouple probe 30 may be similarly insulated by Magnesia 21 and contained within a protective sheath 22.

A thermocouple connected 40 connects each thermocouple probe 30 with a respective two-wire cable 20 for subsequent connection to junction box 11. Each thermocouple connector 40 has a replacable probe portion 50 and a respective fixed wiring harness portion 60. The construction of each probe portion 50 and each wiring harness portion 60 (together referred to as connector portions) is very similar. Each connector portion 50,60 is comprised of a housing 51,61 formed of a corrosion-resistant material. The connector portion housing 51,61, as best seen in FIGS. 6–8, is formed of a base 52,62 and four sidewalls 53,63 which together form a hollow rectangle having one open face opposite base 52,62. A cover plate 54,64 is adapted for placement over the open side of the housing 51,61 opposite base 52,62 thereby forming an enclosed housing chamber. The housing 51,61 is further provided with fastener mounting means comprising an aperture 55,65 through base 52,62 which is adapted to receive and fixedly mount a fastener sleeve 56,66. Similarly, cover plate 54,64 is provided with a respective fastener aperture 57,67 permitting the cover plate 54,64 to be mounted about the other end of fastener sleeve 56,66. In addition, the base 52,62 of each housing 51,61 is provided with two screw apertures 58,68 for temporarily mounting conductors 41,42 during manufacture, as will be more fully described. Finally, the housing 51 of connector probe portion 50 is provided with probe aperture 59 extending through one of the sidewalls 53 for fixedly mounting a respective thermocouple probe 30, and the housing 61 of wiring harness connector portion 60 is provided with a cable aperture 69 extending through one end wall 63 of the housing for sealably mounting an end of an associated cable 20.

Referring particularly to FIG. 6, each portion of connector 40 is provided with a pair of conducting elements, an alumel conductor 41 and a chromel conductor 42. Each of these conductors 41 and 42 are mounted within a respective connector portion housing 51,52 in a manner such that the respective conductor is electrically insulated from the housing 51,61 and the cover plate 54,64. Each conductor 41,42 is insulated from its respective base 52,62 by an insulating washer 18. Each cover plate 54,64 is provided with a pair of conductor apertures 19 having a diameter larger than the external diameter of each of the conductors 41 and 42 such that no electrical contact is made therebetween. Finally, a ceramic insulator-type potting material 17 is inserted into the chamber formed by housing 51,61 and its respective cover plate 54,64 and about the periphery of the respective conductors 41 and 42, thereby mounting the conductors within the housings in an electrically insulated manner.

FIG. 9 shows the assembly of one of said connector portions 50,60 during one of the stages of manufacture. As shown, each of the conductors 41,42 is retained in a suspended position with respect to the housing walls 53,63 by use of a screw 16 inserted through the previously described screw apertures 58 and 68 and through respective insulating washers 18 into one end of each of the alumel and chromel conductors 41 and 42. In this manner, the conductors 41 and 42 are retained in a centrally-located electrically-insulated position with respect to the housing walls 53,63 and cover plate 54,64 while the ceramic insulating and potting material 17, including for example alumina or mica, is inserted into the housing assembly. Once the potting material 17 has set, or has been fired to form a solid ceramic insulating matrix, each screw 16 is removed from the assembly thereby removing any electrical connection of the conductor 41,42 to the housing base 52,62 making the respective connector portion 50,60 ready for use.

As shown in FIGS. 4 and 5, the assembled and ready-to-use connector portions 50 and 60 are attached in an engaged and mating relationship by fastening means 80 to form a corrosion-resistant contact-assured electrical connection between the conductors 41 and 42 of the two portions for large variations of environmental temperature. In the preferred embodiment, fastener 80 comprises a threaded bolt 81 and a threaded nut 82 formed of a material having a predetermined coefficient of thermal expansion. The bolt 81 extends through the fastener sleeves 56 and 66 of the connector portions 50 and 60 and is disposed centrally with respect to the conductors 41 and 42 to fasten the connector portions together and maintain a predetermined range of force engaging the conductors of each portion 41 and 42 together.

The above-described connector is intended for use in adverse environments, particularly in elevated temperature. Accordingly, fastener 80 is formed of a material having a coefficient of thermal expansion less than the coefficient of thermal expansion of the connector portions. By this selection, the connector can be assembled at room temperature with hand-tool levels of torque on the fastener 80. When operated at elevated operating temperatures, the fastener, due to its lesser coefficient of thermal expansion, increases the forces retaining the conductors in an engaged and electrically conductive relationship. Upon subsequent return to room temperature, the forces are reduced and hand-tool levels of torque may disassemble the connector 40 to replace a defective probe 30 and its connector portion 50.

The relative coefficients of thermal expansion of the fastener and connector portions must be of such a nature that the stress imposed upon the contacting surfaces of the conductors does not produce plastic deformation. Plastic deformation of the conductors would cause a less positive electrical connection of the conductors when the connector operates at temperatures less than the peak temperature which caused the deformation. Also, deformation would increase the conductors susceptibility to corrosion.

For use with alumel and chromel conductors, Rene-41 is a material which has a coefficient of thermal expansion suitable for this application.

In the preferred embodiment, the fastener 80 and associated sleeves 56 and 66 are centrally positioned between the conductors 41 and 42 such that the compressive forces of the fastener are equally distributed over the conductor contacting surfaces.

FIGS. 10 and 11 show two alternative methods of interconnecting the alumel or chromel connectors 41 and 42 of a respective probe portion 50 and wiring harness portion 60 of a thermocouple connector 40. In the first alternative embodiment, shown by FIG. 10, the conductor of one portion is provided with a male contacting surface 43 having an axially-convergent conical surface. The opposed and mating conductor of the other connector portion is provided with a female contacting surface 44 having an axially-divergent conical surface. Each of said conductors is further provided with a central recess 45 which creates a central chamber when the two conductors are in an engaged and mated condition. Accordingly, the resulting surface of contact when the respective conductor elements are in an engaged and mated condition is defined by a truncated right frustum cone.

In the second alternative embodiment shown by FIG. 11, the conductor of one portion is provided with a V-shaped contacting surface 46. The V-shaped contacting surface 46 is comprised of an interior radially-divergent conical surface 47 combined with an exterior radially-convergent conical surface 48 which together form an initial annular line of contact with a plane. The mating conductor is provided with a planar contacting surface 49 which mates, engages with, and makes electrical contact with said V-shaped contacting surface 46.

In both of these alternative embodiments of contacting surfaces of the respective alumel and chromel conductors 41 and 42, it is intended that the conductors, particularly at their contact surface, be elastically deformable in response to and in the range of the stresses imposed by the fastener 80 during increases in the environmental temperature of the connector 40 by virtue of its lesser coefficient of thermal expansion. In this manner, an increased reliability corrosion-resistant contact-assured electrical connection is made between the conductors of the improved electrical connector 40 in response to an increase in operating temperature surrounding the thermocouple connector 40. Further, said conductors may be formed of the same material as the thermocouple elements and wires, but many times thicker and heavier to increase the contacting surface area and lower the electrical resistance of the connection.

It may also be noted that one of the mating contact surfaces 43,44 of a pair of conductors 41,42 may be a ground surface, held to very close tolerances, while the other mating surface may be machined on a lathe, for example, to lesser tolerances, so that there will be a number of points of firm engagement between the course and smoothly finished surfaces when fastened by the fastener with hand-tool torques. These points of firm engagement elastically deform to large surfaces of contact in response to increased forces exerted by the fastener as the ambient temperature of the connector increases.

In conclusion, the present invention has been described in terms of one illustrative embodiment having two alternative configurations of conductor contacting surfaces. It is to be understood that the principles of the invention could be implemented by other geometrical arrangements of the connector elements and by other conducting and fastening materials, if desired, and still be within the scope and spirit of the present invention. Accordingly, the scope of the present invention is limited only by the following claims.

What is claimed is:

1. A thermocouple wiring harness and system including:
    a junction box;
    a plurality of two-wire corrosion-resistant cables extending from and electrically connected by said junction box;
    a plurality of thermocouple probes having two elements for sensing temperature in multiple predetermined locations; and
    a plurality of improved thermocouple connectors for connecting each of said thermocouple probes to a respective cable, each improved thermocouple connector comprising:
    a replaceable probe portion attached to said thermocouple probe and including a housing, a pair of electrical conductors positioned at opposite ends of said housing and electrically insulated therefrom, each of said conductors being electrically connected to one element of said two elements of said thermocouple probe, each of said conductors being further provided with an externally exposed contact surface;
    a fixed wiring harness portion attached to one of said cables and including a housing, a pair of electrical conductors positioned at opposite ends of said housing and electrically insulated therefrom, each of said conductors being electrically connected to a wire of said cable, each of said connectors being further provided with an externally exposed contact surface for electrically contacting said contact surface of an associated one of said conductors of said probe portion; and
    a fastener for releasably mounting and retaining said probe portion and said wiring harness portion in an engaged and mated condition such that the conductors of the probe portion are electrically connected to the associated conductors of the wiring harness portion, said fastener having a predetermined coefficient of thermal expansion less than the coefficient of thermal expansion of said connector probe and wiring harness portions such that the retaining force of said fastener increases in proportion to increases in the ambient temperature of the connector environment without causing plastic deformation of the conductors, said fastener being centrally positioned with respect to said conductors.

2. The thermocouple wiring harness and system of claim 1 wherein said contact surfaces of each of said electrical conductors of said probe portion are axially-convergent and have a central recess, said contact surfaces of each of said conductors of said wiring harness portion are axially-divergent and have a central recess, whereby the surface of contact formed by two engaged conductors when placed in a coaxial and mating position is that of a truncated right frustum cone.

3. The thermocouple wiring harness and system of claim 1 wherein said electrical conductors of said probe portion have a V-shaped contacting surface having a radially interior axially-divergent surface portion, a radially exterior axially-convergent surface portion, and a central recess, and said conductors of said wiring harness portion have a planar contact surface with a central recess, whereby the surface of contact formed by two engaged conductors when placed in a coaxial and mating position is an annular line.

4. The thermocouple wiring harness and system of claim 2 or 3 wherein said conductors are each formed of a metal alloy selected from the group consisting of chromel, alumel, iron, constantan, copper, platinum, rhodium, and platinel.

5. The thermocouple wiring harness and system of claim 2 or 3 wherein the contact surface of one conductor of a mating pair of conductors is machined to a coarse finish and the contact surface of the other conductor of the mating pair is machined to a smooth finish.

6. A multiple thermocouple system for use in extreme adverse conditions comprising:
a fixed wiring harness including a plurality of fixed wiring harness connector portions;
a corresponding plurality of removable probe connector portions each having a thermocouple extending therefrom; and
fastener means for securing one of said plurality of removable probe connector portions to each of said plurality of fixed wiring harness connector portions whereby said fastener means increases the pressure between each pair of probe and wiring harness portions with increased temperature.

7. A multiple thermocouple system as defined in claim 6 wherein each of said thermocouples includes wires of dissimilar thermocouple materials electrically connected together at a junction, and wherein each of said fixed wiring harness portions and each of said removable probe portions includes a pair of heavy electrical conductors formed of said dissimilar thermocouple materials, and said conductors being many times thicker and heavier than said thermocouple wires.

8. A multiple thermocouple system as defined in claim 6 wherein said fastening means includes a fastener having a coefficient of thermal expansion less than the coefficient of thermal expansion of said wiring harness portions and said probe portion.

9. An improved thermocouple connector for replacably connecting a thermocouple probe to a wiring harness comprising:
a probe connector portion attached to said thermocouple probe and including a housing, a plurality of electrical conductors mounted within and electrically insulated from said housing, each having a contact surface externally exposed relative to said housing;
a wiring harness connector portion including a housing, a cable of the wiring harness extending externally of the housing; a plurality of electrical conductors mounted within and electrically insulated from said housing, each having a contact surface externally exposed relative to said housing and adapted to engage and electrically contact respective contact surfaces of the conductors of the probe portion;
a fastener mounting means comprising an aperture centrally positioned with respect to said electrical conductors of said probe and wiring harness connector portions; and
a fastener passing through said fastener mounting means for releasably mounting and retaining said probe portion and said wiring harness portion in an engaged and mated condition such that the conductors of the probe portion are electrically connected to the associated conductors of the wiring harness portion, said fastener having a predetermined coefficient of thermal expansion less than the coefficient of thermal expansion of said probe and wiring harness connector portions such that the retaining force of said fastener increases in proportion to increases in the ambient temperature of the connector environment without causing plastic deformation of the conductors.

10. The connector of claim 9 wherein one of said plurality of electrical conductors of said probe portion and one of said plurality of electrical conductors of said wiring harness portion are formed of alumel, another of said plurality of electrical conductors of said probe portion and another of said plurality of electrical conductors of said wiring harness portion are formed of chromel, and said fastener is formed of Rene-41.

11. The connector of claim 9 wherein said fastener is formed of a material having a coefficient of thermal expansion less than the coefficient of thermal expansion of said connector portions.

12. The connector of claim 11 wherein the housing for the probe portion of the connector and the housing for the wiring harness portion of the connector are each comprised of a base with sidewalls and a cover plate which in combination form a hollow rectangular chamber; the plurality of electrical conductors comprise two conductors positioned in a longitudinally-spaced relationship such that each conductor is proximate one end of the housing; and the mounting means comprises a fastener sleeve attached to said housing, having an axis within the plane which bisects the longitudinal axis between said conductors, and forming in combination with the housing and cover plate a bore through which the fastener may be positioned; said bore being oriented such that the bore of each portion of the mating connectors are coaxial when the respective conductors are in an engaged and electrically-conductive position.

13. The connector of claim 11 or 12 wherein said fastener comprises a bolt and nut combination adapted to cooperate with said mounting means of each of said connector portions to retain the respective conductors of said connector portions in an engaged and mated relationship for all operating temperatures.

14. The connector of claim 13 wherein one of said plurality of electrical connectors of said probe connector portion and said wiring harness connector portion is formed of alumel, another of said plurality of connector portions is formed of chromel, and said fastener is formed of Rene-41.

15. A pair of electrical conductors for use in a high-temperature thermocouple connector and mounted in respective connector portions, one of said electrical conductors being formed of thermocouple material and including a contact surface which is axially-convergent and has a central recess, the other of said conductors being formed of the same thermocouple material and including a contact surface which is axially-divergent and has a central recess, whereby the surface of contact is formed by the two conductors when placed in a coaxial and mating position is that of a truncated right frustum cone.

16. A pair of electrical conductors for use in a high-temperature thermocouple connector and mounted in respective connector portions, one of said electrical conductors being formed of thermocouple material and having a V-shaped contacting surface including a radially interior axially-divergent surface portion, a radially exterior axially-convergent surface portion, and a central recess, the other of said electrical conductors being formed of the same thermocouple material and including a planar contact surface having a central recess, whereby the surface of contact formed by the two conductors when placed in a coaxial and mating position is an annular line.

17. The pair of electrical conductors of claim 15 or 16 wherein said pair is formed of a metal alloy selected from the group consisting of chromel, alumel, iron, constantan, copper, platinum, rhodium, and platinel.

18. The pair of electrical conductors of claim 15 or 16 wherein the contact surface of one conductor of said pair is machined to a coarse finish and the contact surface of the other conductor is machined to a smooth finish.

* * * * *